(12) United States Patent
Baraff et al.

(10) Patent No.: US 8,253,753 B1
(45) Date of Patent: Aug. 28, 2012

(54) DUAL-TYPE COMPONENT CONNECTIONS

(75) Inventors: David Baraff, Oakland, CA (US); Christine Waggoner, Berkeley, CA (US)

(73) Assignee: Pixar, Emeryville, CA (US)

( * ) Notice: Subject to any disclaimer, the term of this patent is extended or adjusted under 35 U.S.C. 154(b) by 526 days.

(21) Appl. No.: 12/488,815

(22) Filed: Jun. 22, 2009

(51) Int. Cl.
*G06T 1/00* (2006.01)
*G09G 5/26* (2006.01)
*H04L 12/28* (2006.01)
*H04J 3/16* (2006.01)
*G05B 11/01* (2006.01)
*G06F 15/16* (2006.01)
*G06F 15/00* (2006.01)

(52) U.S. Cl. ........ 345/581; 345/418; 345/473; 345/501; 370/395.3; 370/466; 700/19; 700/21; 709/201; 709/205; 712/111

(58) Field of Classification Search .......... 345/581–582, 345/501–506, 519–520, 418–420, 618–619, 345/473; 370/395.3, 395.32, 464, 466, 490; 700/1–2, 19, 20–21, 30, 108–110; 709/201, 709/205; 712/1, 11, 200
See application file for complete search history.

(56) References Cited

U.S. PATENT DOCUMENTS

| 6,829,634 | B1 * | 12/2004 | Holt et al. ............. 709/204 |
| 6,910,069 | B1 * | 6/2005 | Holt et al. ............. 709/221 |
| 6,957,186 | B1 * | 10/2005 | Guheen et al. ......... 705/323 |
| 2004/0148348 | A1 * | 7/2004 | Holt et al. ............. 709/204 |
| 2009/0176461 | A1 * | 7/2009 | Kautz et al. ........... 455/90.2 |
| 2011/0185288 | A1 * | 7/2011 | Gupta et al. .......... 715/752 |

* cited by examiner

*Primary Examiner* — Wesner Sajous
(74) *Attorney, Agent, or Firm* — Patterson & Sheridan, LLP

(57) ABSTRACT

Component connections are preserved during destructive component operations. Upon receiving a notification of the destruction of a direct component connection, a direct component connection is converted to an implied component connection. The implied component connection may be specified as additional component attributes of one or both components associated with the direct component connection or as data external to the component data structures. This allows preservation of the component connection despite destructive component operations. Upon the creation of a component, it is determined if the newly created component corresponds with a previously destroyed component that was associated with a direct connection. If the newly created component corresponds with this previously destroyed component, a direct component connection is created for the newly created component as specified by the implied component connection. Component connections can be recreated upon loading or instantiating components or upon accessing a component via a revision control system.

26 Claims, 7 Drawing Sheets

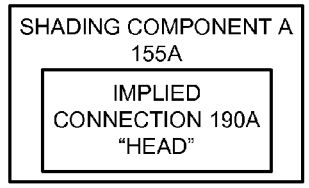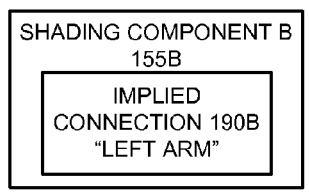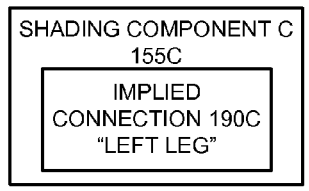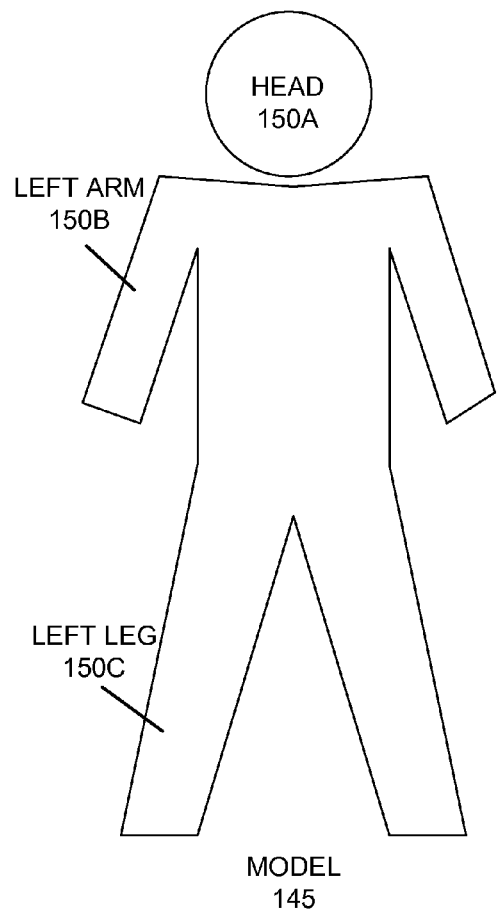
FIG. 1C

300

```
┌─────────────────────────────────────┐
│              305                    │
│    SEARCH FOR IMPLIED CONNECTIONS   │
└─────────────────────────────────────┘
                  │
                  ▼
┌─────────────────────────────────────┐
│              310                    │
│  IDENTIFY COMPONENTS WITH BROKEN    │
│  DIRECT CONNECTIONS FROM IMPLIED    │
│           CONNECTIONS               │
└─────────────────────────────────────┘
                  │
                  ▼
┌ ─ ─ ─ ─ ─ ─ ─ ─ ─ ─ ─ ─ ─ ─ ─ ─ ─ ┐
│              315                    │
│    DISPLAY BROKEN DIRECT            │
│         CONNECTIONS                 │
└ ─ ─ ─ ─ ─ ─ ─ ─ ─ ─ ─ ─ ─ ─ ─ ─ ─ ┘
                  │
                  ▼
┌─────────────────────────────────────┐
│              320                    │
│   REPAIR BROKEN DIRECT CONNECTIONS  │
└─────────────────────────────────────┘
```

FIG. 3

DUAL-TYPE COMPONENT CONNECTIONS

BACKGROUND

The invention relates to the field of computer graphics, and in particular to methods and apparatus for creating and maintaining connections between computer graphics components.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking and artistically compelling rendered images and animations.

Computer graphics images, animations, and other productions involving computer graphics, such as interactive entertainment software, are created using computer graphics applications operating on or processing a number of different components. Generally, components include any data and instructions used to create products and applications that include computer graphics. Components can include three-dimensional models of geometry; texture maps and other arrays of data; lighting and shading programs used to determine the visual appearance of models; simulation systems; and animation data and deformer functions used to specify changes and motion over time.

Components typically include one or more attributes containing data associated with the component. Attributes can specify any static or varying property of a component. For example, a component may be a model of a sphere. Attributes of this example component could describe properties such as the radius of the sphere and the location of the center of the sphere. Different types of components may include different numbers and types of attributes.

Components are often related to each other with complex cross-reference, inheritance, and dependency relationships. Many computer graphics content creation applications, such as applications for uses including modeling, animation, lighting, texturing, and shading, specify relationships between pairs of components for a variety of purposes. These relationships are typically implemented as references within the software application and are referred to as direct connections. These applications typically include functions for adding direct connections between two components, deleting direct connections between two components, and querying components to identify any directly connected components. The software application is typically responsible for creating, deleting, and maintaining the integrity of direct connections between components, for example using pointers, linked lists, sets of component identifiers, and/or graph data structures.

Users of software applications often need to specify additional relationships between components. These additional relationships may be used to specify operations or processing to be performed using these components within the same software application or by one or more other software applications. For example, a user may specify a lighting relationship between a light component and an object component within a modeling software application. A rendering application will use this lighting relationship to apply an illumination effect to the object component.

Additional relationships defined by users (or by user-defined applications, scripts, macros, or other programmable functionality acting alone or in conjunction with one or more software applications) may be implemented using the direct connection functionality included in many computer graphics content creation software applications. However, using the direct connection functionality of a computer graphics content creation software applications can lead to problems when components are temporarily or permanently deleted.

For example, a texture component may be associated via a direct connection with an object component to apply a texture to the object. If a modeling user decides to redesign the object and deletes original object component during this process, other users, such as texture artists, will not be able to determine the purpose of the texture component. Moreover, once the modeling user deletes the original object component, the direct connection is also automatically deleted. The modeling user must then recreate the object component and its direct connection with the texture component to restore the functionality of the texture component.

In another example, many operations that appear simple to user may cause the temporary destruction of components, and thus the destruction of their direct connections. Subsequent operations that recreate these components will not automatically restore the destroyed direct connections. For example, if a user desires to replace an older object component named "Foo" with a new version of the object component, the user may first delete the older object component and then rename the new version of the object component to "Foo," so that it has the same name as the object component it replaces. However, upon deleting the older object component, all of the direct connections to this component are immediately destroyed. Renaming the new version of the object component does not recreate or restore these direct connections. Instead, prior systems required users to manually recreate all of the direct connections for replacement components. This process is time-consuming and error-prone.

Therefore, there is an unmet need for computer graphics content creation applications to create and maintain connections between components in an automatic and robust manner.

BRIEF SUMMARY

An embodiment of the invention preserves component connections through destructive component operations. Upon receiving a notification of the destruction of a direct component connection, an embodiment of the invention converts the direct component connection to an implied component connection. The implied component connection may be specified as additional component attributes of one or both components associated with the direct component connection. The implied component connection may also be specified as data external to the component data structures, such as a cache or database of component connections.

In an embodiment, upon the creation of a component, an embodiment of the invention determines if the newly created component corresponds with a previously destroyed component that was associated with a direct connection. An embodiment of the invention may make this determination by comparing the newly created component with the components specified by an implied component connection. If the newly created component corresponds with the previously destroyed component associated with a direct component connection, then an embodiment of the invention creates a direct component connection between the newly created component and one or more additional components, as specified by the implied component connection.

A further embodiment of the invention may be executed upon loading or instantiating components in a software application or upon checking a component into or out of a revision control system.

An embodiment of the invention may display broken direct connections to users or provide an output including the broken direct component connections to other applications.

BRIEF DESCRIPTION OF THE DRAWINGS

The invention will be described with reference to the drawings, in which:

FIGS. 1A-1D illustrates examples of dual-type component connections according to an embodiment of the invention;

FIG. 3 illustrates a method of repairing broken component connections according to an embodiment of the invention.

DETAILED DESCRIPTION

Figure 1A:
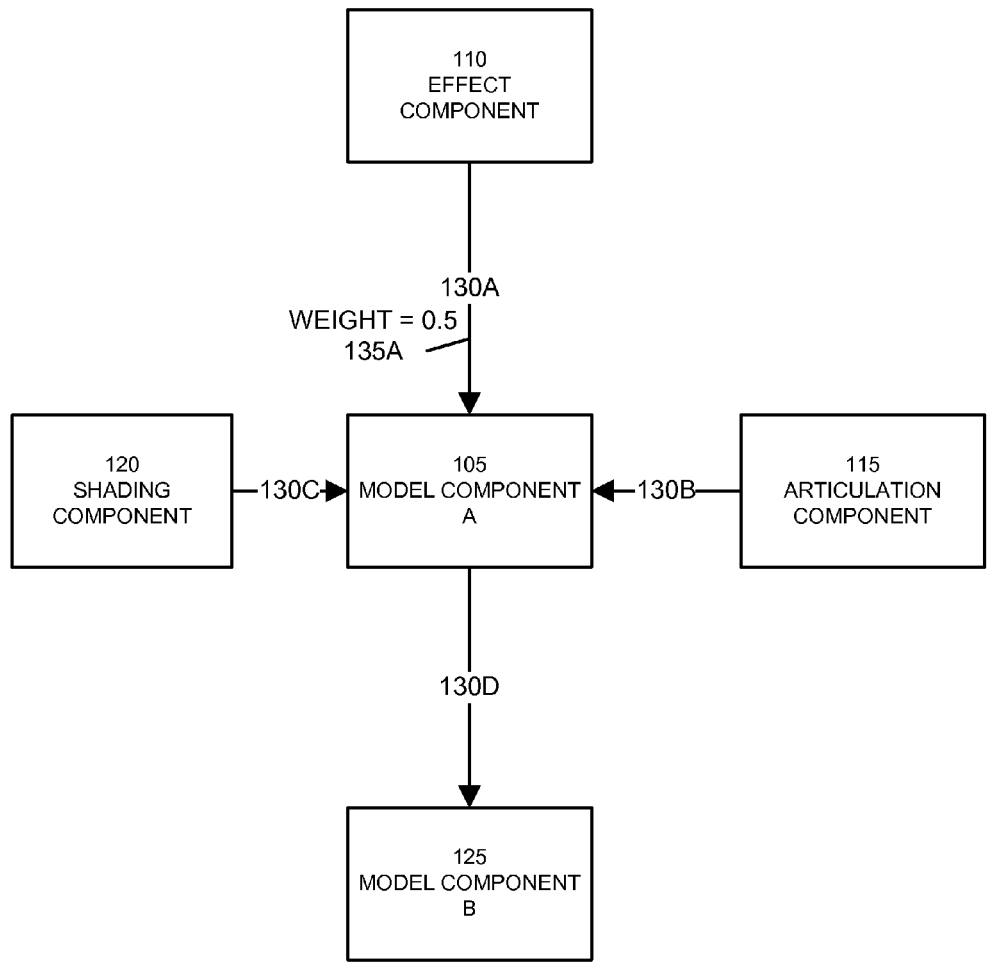

FIGS. 1A-1D illustrates examples of dual-type component connections according to an embodiment of the invention. FIG. 1A illustrates an example set of connected components suitable 100 for use with embodiments of the invention. The example set of connected components 100 includes model component A 105 and model component B 125. The example set of connected components also includes an effect component 110, which may be adapted to apply a visual effect to a component; an articulation component 115, which may be adapted to transform and/or deform an object component in response to animation variable values; and a shading component 120, which is adapted to apply shading or illumination to a component.

In this example, the set of connected components 100 includes direct connections 130 that specify functional or other types of relationships between the components. For example, direct relationship 130a specifies that the operation of the effect component 110 is applied to the model component A 105. Similarly, direct connections 130b and 130c specify that the functions or operations of the articulation component 115 and the shading component 120, respectively, are applied to the model component A 105. Model components A 105 and B 125 are connected via a direct connection 130d, which specifies a hierarchy or group relationship between these two components.

In general, a direct connection is any type of connection between two or more components that is actively maintained by one or more software applications or a system to ensure that the connection is valid. If the validity of a direct connection cannot be ensured, then the direct connection is automatically deleted. For example, if one component is deleted, then any direct connections between this component and other components will automatically be deleted, This deletion prevents these associated direct connections from becoming invalid due to references to the deleted component.

Software applications and systems that manipulate components typically include functions for adding direct connections between two components, deleting direct connections between two components, and querying components to identify any directly connected components. The software applications or system are typically responsible for creating, deleting, and maintaining the integrity of direct connections between components, for example using pointers, linked lists, sets of component identifiers, and/or graph data structures.

In an embodiment, some or all of the direct connections can include relationship attributes for further defining or modifying the relationship between components. For example, direct connection 130a includes a weight attribute 135 adapted to modify or weight the output of the effect component 110 by a factor of 0.5. In an alternate embodiment, direct connections do not include relationship attributes. Instead, attributes defining or modifying the relationships between components are included in components.

In an embodiment, the direct connections 130 are created, maintained, and destroyed by one or more computer graphics content creation applications, such as applications for uses including modeling, animation, lighting, texturing, and shading, specify direct relationships between pairs of components for a variety of purposes. In an embodiment, the direct connections 130 are implemented as directly defined references to data representing components within the software application. For example, a software application can include pointers, linked lists, and/or any other type of graph data structure to reference data structures representing the components associated with a direct connection.

In an embodiment, computer graphics content creation applications include functions for adding direct connections between two components, deleting direct connections between two components, and querying components to identify any directly connected components. The software application is typically responsible for creating, deleting, and maintaining the integrity of direct connections between components. This can include ensuring that the pointers, linked lists, and/or other graph data structures used to represent direct connections always reference a valid component. If a component is deleted, the software application deletes any references to the component that correspond with direct connections, ensuring that there are no invalid or null references to non-existent components.

Because the software application represents component relationships as direct connections, prior software applications will automatically delete direct connections between components during destructive component operations. For example, if a user desires to replace an older object component named "Foo" with a new version of the object component, the user or application may first delete the older object component and then create a new version of the object component. However, upon deleting the older object component, all of the direct connections to this component are immediately destroyed. Renaming the new version of the object component does not recreate or restore previously destroyed direct connections associated with a component of the same name.

To solve the problems inherent in direct connections, an embodiment of the invention automatically changes direct component connections into another type of connection, referred to as an implied connection, under some circumstances, such as during destructive component operations.

In an embodiment, an implied connection is not actively maintained by any software applications or systems. Thus, an implied connection may be invalid at some times. For example, if a first component has an implied connection with a second component and the second component is deleted, the implied connection persists, even though it is now invalid because it references the deleted component. Thus, implied connections are persistent during destructive component operations. However, implied connections are extremely vulnerable to invalidation. As discussed above, if a component referenced by an implied connection is deleted, the implied connection becomes invalid because it references a component that no longer exists. In another example, if a component referenced by name using an implied connection is renamed, the implied connection will be invalid because it references the component by its old name. Because software applications and systems do not automatically update or maintain implied connections, many types of destructive and non-destructive component operations (such as deletion and renaming, respectively) can invalidate implied connections.

An embodiment of the invention may by default represent component relationships as direct connections. By using direct component connections to represent component relationships, the component relationships are automatically maintained during non-destructive component operations. However, when a destructive component operation is being performed, this embodiment of the invention automatically changes the associated direct component connections into implied component connections. This allows component relationships to be maintained during the destructive component operations. Following completion of a destructive component operations, an embodiment of the invention automatically converts the associated implied component connections back to direct component connections, so as to automatically maintain the component relationships during any subsequent non-destructive component operations.

Figure 1B:
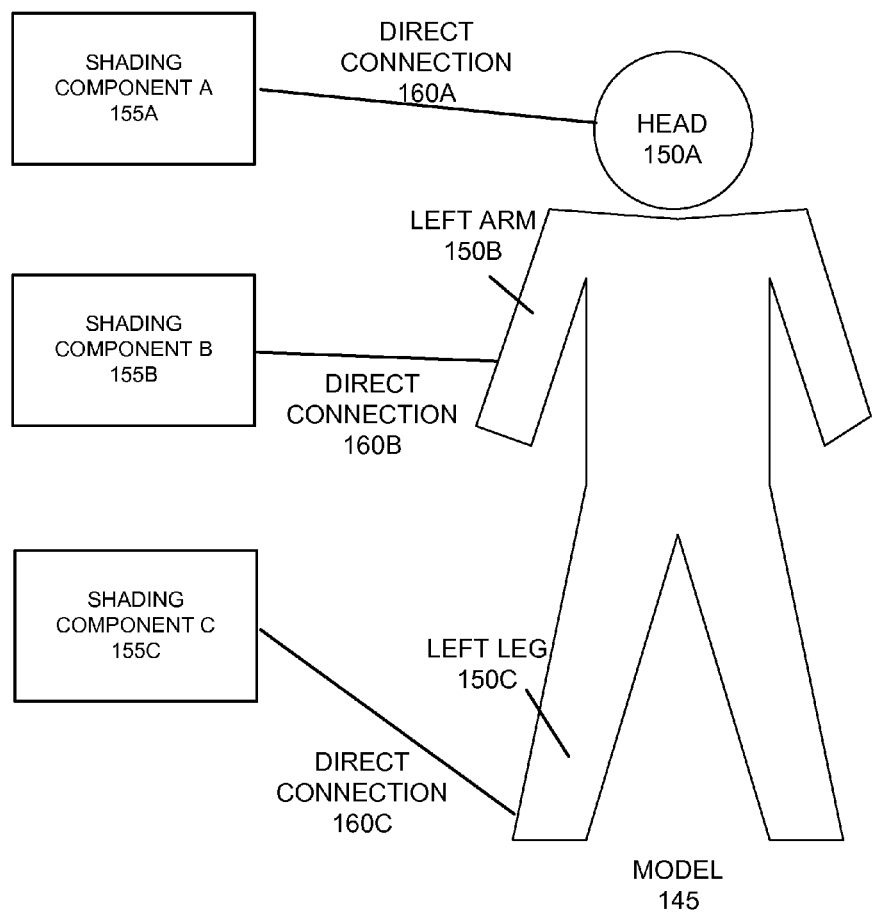

FIGS. 1B and 1C illustrate an example application of this embodiment of the invention. FIG. 1B illustrates an example 140 of the use of direct component connections to represent component relationships. In example 140, a character model 145 includes sub-components representing a head 150A, a left arm 150B, and a left leg 150C. In this example 140, different shading components 155, applying texturing, lighting, and/or shading, are associated with the sub-components 150 of character model 145 via direct component connections 160. For example, shading component A 155A is associated with head 150a via direct connection 160A, thereby applying the shading operations specified by shading component A 155A to head 150A. Similarly, shading component B 155B is associated with left arm 150B via direct connection 160B and shading component C 155C is associated with left leg 150C via direct connection 160C.

Because of the use of direct connections 160, the component relationships between the shading components 155 and the sub-components 150 of the character model 145 are automatically maintained during non-destructive component operations. However, during a destructive component operation, if a component is deleted, its associated direct component connections are automatically destroyed.

To maintain component relationships during destructive component operations, an embodiment of the invention automatically converts direct component connections into implied component connections during the destructive component operation. FIG. 1C illustrates an example 170 of the use of implied component connections to preserve component relationships during destructive component operations. In example 170, the direct connections 160 shown in example 140 have been replaced with corresponding implied connections 190.

For example, shading component A 155A includes an implied connection 190A that specifies a component relationship with the "Head" sub-component 150A of character model 145. As discussed in detail below, this implied connection 190A may be implemented as an attribute of the shading component A 155A. Similarly, shading component B 155B includes implied connection 190B that specifies a component relationship with the "Left Arm" sub-component 150B of character model 145, and shading component C 155C includes implied connection 190C that specifies a component relationship with the "Left Leg" sub-component 150C of character model 145.

Because the implied component connections 190 are implemented within shading components 155, they are unaffected by destructive component operations performed on character model 145 and its sub-components 150. For example, if a destructive component operation deletes the head sub-component 150A, the implied connection 190A within shading component A 155A will be unaffected. Later, if the head sub-component 155A is recreated and given the same name or other identifier, the shading component 155A will automatically by associated with this recreated component by implied connection 190A. In this manner, implied component connections are used to preserve component relationships during destructive component operations.

Figure 1D:
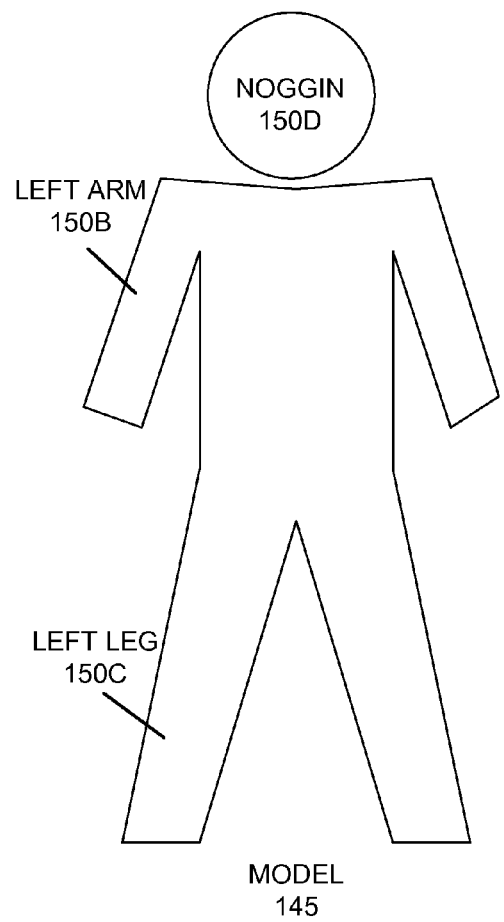

Although implied component relationships are capable of being maintained through destructive component operations, they are vulnerable to corruption. FIG. 1D illustrates an example 192 of a corrupted implied component relationship. In this example 192, the head sub-component 150A of the character model 145 shown in the previous examples has been replaced with a sub-component 150D named "Noggin." Sub-component 150D may be created by renaming or replacing sub-component 150A. Because there is no longer any sub-component named "Head" associated with the character model 145, the implied connection 190A referencing the sub-component named "Head" is invalid. To minimize the chance of corrupting an implied connection, a further embodiment of the invention may convert implied component connections back to corresponding direct component connections following the completion of the destructive component operation. This allows component relationships to be automatically maintained during subsequent non-destructive component operations, such as renaming a component.

Figure 2:
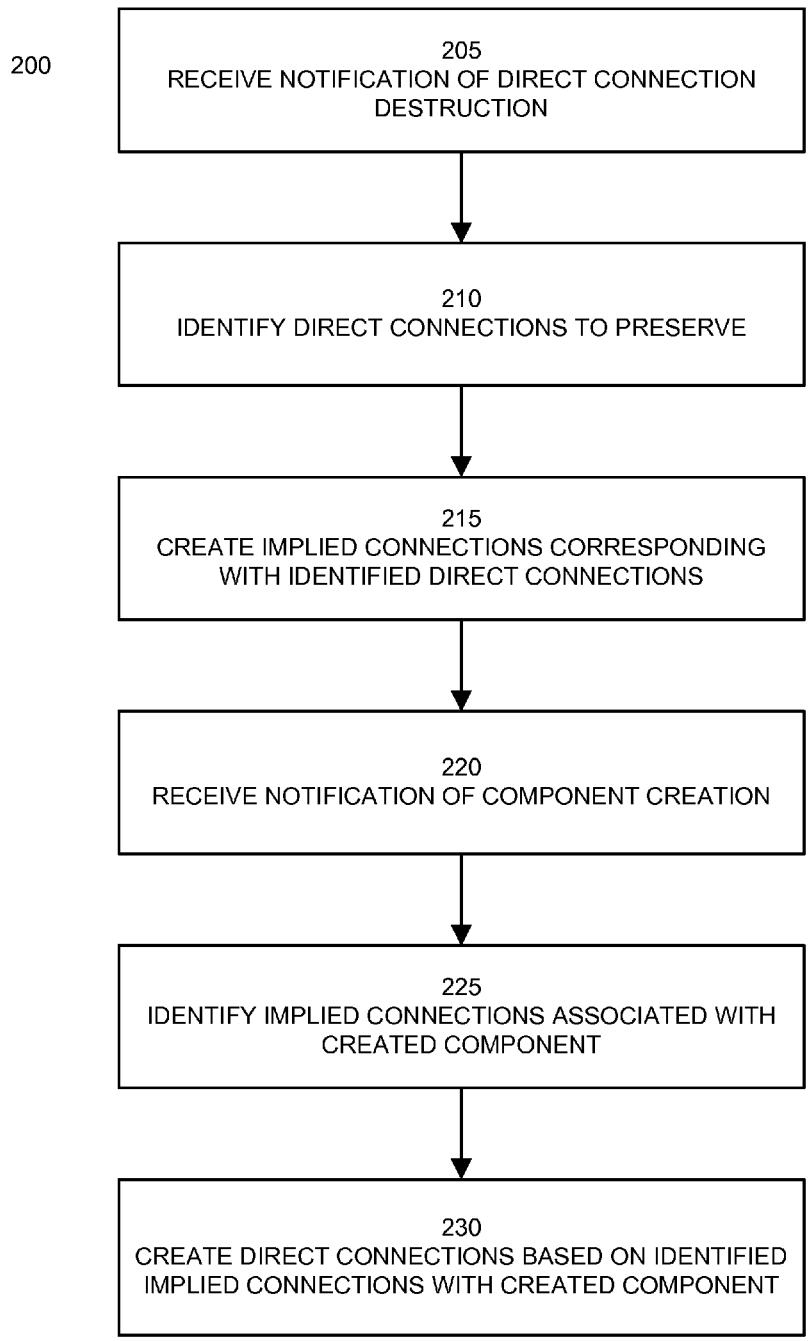
FIG. 2 illustrates a method of maintaining component connections following destructive component operations according to an embodiment of the invention.

FIG. 2 illustrates a method 200 of maintaining component connections following destructive component operations according to an embodiment of the invention. In an embodiment, method 200 begins when step 205 receives notification from a software application, such as a computer graphics content creation application, that one or more direct connections associated with components are going to be destroyed. In this embodiment, the application may provide this notification via an API, an event messaging system, or any other inter-application or intra-application notification or messaging system known in the art. This notification may be generated automatically by the application in response to a user command or execution of a script, program, macro, or other automated action. Alternatively, this notification may be generated manually, for example by the execution of a specific command included in scripts, programs, macros, or other automated actions associated with the application and adapted to perform destructive component operations.

Alternate embodiments of step 205 can receive notifications from a software application in response to other events or actions that indicate direct connections are going to be or have been destroyed. For example, an alternate embodiment of step 205 can receive a notification that a component has been or is about to be destroyed.

Following step 205, step 210 identifies one or more direct connections that should be preserved. In an embodiment, the notification received in step 205 includes an identification of the direct connections to be destroyed by a destructive component operation. In another embodiment, step 210 can issue one or more commands or queries to the application via an API or other communications system to identify the direct connections to be destroyed by a destructive component operation. Queries may be based on an identification associated with a received notification, with one or more components identified by a received notification, and/or any other attributes of components, connections, and the application that are exposed by the application to the method. In still another embodiment, step 210 can access a cache or record of previously existing direct connections to determine the identity of any direct connections that have been or will be destroyed.

Step 215 creates implied connections corresponding with the one or more direct connections identified in step 210. In an embodiment, an implied connection represents a relationship between components as one or more attributes of one of the components. For example, if an effect component has a relationship with a model component, an implied connection may be implemented by adding one or more component attributes to the effect component. This effect component's added attribute specifies that there is a relationship between this component and the model component. For example, the effect component can include an added component attribute "Implied Connection" that is set to a value representing the name or an identifier associated with the model component, such as "Model Component A."

Unlike direct connections, in an embodiment the software application does not necessarily automatically create, destroy, and maintain implied connections. Thus, there is no guarantee that a component attribute defining an implied connection is making a valid reference. For example, if an implied connection is defined by a component attribute that specifies the name of a related component, there is nothing to prevent the user or the software application from deleting, renaming, or otherwise changing this related component. Moreover, the component attribute value will remain unchanged despite these changes to the related component. Thus, if the related component is deleted or renamed, the implied connection will reference a non-existent component and be invalid.

In an embodiment, step 215 creates implied connections corresponding with the one or more identified direct connections by adding attributes to the affected components. In an embodiment, step 215 adds an attribute to each component associated with one of the identified direct connections. This attribute is set to a value that includes the name or other identifier associated the other component of this direct connection. For example, if an "Effect Component" and "Model Component A" have a direct connection, then an embodiment of step 215 may add an attribute "Implied Connection" set to a value of "Model Component A" to the "Effect Component." Similarly, this embodiment of step 215 may add an attribute "Implied Connection" set to a value of "Effect Component" to the "Model Component A."

In a further embodiment, if the direct connection between two components includes one or more attributes for further defining or modifying the relationship between components, step 215 may add these connection attributes and their values to the implied connection in the form of additional component attributes and values or as part of the value of the added component attribute representing the implied connection.

In an embodiment, step 215 adds attributes to components to define implied connections in the form of user-defined or custom attributes that are intended to be ignored by the software application, absent any direction to the contrary. In a further embodiment, step 215 may store these attributes in a data structure outside of the component data, such as an array, list, cache, or other memory data structure; or a file, database, or any other type of disk or nonvolatile memory data structure. This external data structure may be associated with a revision control system. In still a further embodiment, method 200 may make this external data structure available to other applications, allowing component relationships to be preserved over multiple software applications despite destructive component operations performed within a single software application.

Once step 215 has created implied connections corresponding with the identified direct connections, the software application may destroy or modify components and their direct connections to perform one or more component operations. Component operations may be initiated by a user or by execution of a script, program, macro, or other automated actions.

Step 220 receives a notification of the creation of one or more components by the software application. In an embodiment, step 220 receives this notification automatically from the application in response to the creation of any type of component by the software application. In another embodiment, the software application generates this notification in response to a command from a user or from the execution of a script, program, macro, or other automated actions. Step 220 may receive notifications during the execution of one or a sequence of component operations or following the completion of one or a sequence of component operations. In an embodiment, step 220 may receive the notification of the creation of one or more components from the software application via an API, an event messaging system, or any other inter-application or intra-application notification or messaging system known in the art.

In response to the receipt of the notification that one or more components have been created, step 225 determines if there are any implied connections associated with the created component. In an embodiment, step 225 searches for component attributes included in one or more of the other, previously existing components that specify implied connection.

An embodiment of step 225 may search all of the previously-existing components for component attributes specifying implied connections. Another embodiment of method 200 may added components to a list when creating implied connections, such as in step 215; step 225 may then limit its search to components identified by this list. Step 225 may search for component attributes specifying implied connections using a search or data inspection technique, including querying a software application via an API or other type of interface, parsing component data files, or querying databases storing component data. In yet another embodiment, step 225 may search an external data structure outside of the component data for component attributes specifying implied connections.

Upon finding a component attribute specifying an implied connection, step 225 compares the value of this component attribute with the name or other identifier of the newly created component. If these values match, then embodiment of step 225 includes this implied connection in a list or set of connections associated with the newly created component.

For example, if the newly created component is named "Effect Component" and the previously existing "Model Component" includes a component attribute "Implied Connection" having a value set to "Effect Component," then step 225 will include this implied connection in a list or set of connections associated with the newly created "Effect Component."

Following step 225, if there are any implied connections identified as being associated with the one or more newly created components, then step 230 creates direct connections corresponding with these identified implied connection. In an embodiment, for each identified implied connection, step 230 identifies the previously existing component that included the component attribute specifying this implied connection and the newly created component identified by the value of this component attribute. For each identified implied connection, step 230 then creates a direct connection between these two components based on the component attributes specifying the implied connection.

For example, if the newly created component is named "Effect Component" and the previously existing "Model Component" includes a component attribute "Implied Connection" having a value set to "Effect Component," then step 230 will create a direct connection between the "Effect Component" and the "Model Component."

In an embodiment, step 230 creates a direct connection by directing the software application, via an API or other interface type, to create the desired direct connection between two components. In this embodiment, step 230 leverages the direct connection creation functionality of the software application. In another embodiment, step 230 modifies component data structures in memory, in a file, in a database, or in any other type of data storage, to create the desired direct connection.

In an embodiment, if the implied connection includes one or more connection attributes for further defining or modifying the relationship between components, step 230 may add these connection attributes and their values to the newly created direct connection in the form of additional connection attributes and values.

In an embodiment, following the creation of a direct connection corresponding with one of the identified implied connections, step 230 removes the corresponding implied connection. In an embodiment, step 230 removes the component attributes specifying the corresponding implied connection from the components. In another embodiment, step 230 removes the implied connection from an external data structure.

Thus, method 200 preserves component relationships through destructive component operations. For example, if a first component is deleted as part of an editing operation, its direct connections with other components will be destroyed. However, the remaining components will preserve the knowledge of these previously existing component relationships in the form of implied connections. When the first component is later recreated, for example at the completion of the editing operation, method 200 will recreate all of the direct connections previously associated with this component using the implied connection information stored in association with the other components.

A further embodiment of the invention can maintain component relationships across multiple software applications and over long periods of time. For example, an animation component used in an animation software application may be associated with a model component created and edited using a modeling application. In this example, a modeling user may destructively edit the model component over a period of several days to complete the revised model component. During this time period, this embodiment of the invention may identify the missing component and its associated missing or broken component connections. Upon restoration of the model component, this embodiment of the invention may automatically recreate the direct connections associated with the previous version of the model component.

FIG. 3 illustrates a method 300 of restoring broken component connections according to an embodiment of the invention. Embodiments of method 300 may be initiated in a variety of circumstances. In a first example, a user or script, program, macro, or other automated action may initiate method 300 at any arbitrary time to search for and restore broken component connections. In another example, method 300 may be initiated upon loading or instantiating one or more components in a software application. In still another example, method 300 may be initiated in association with a revision control system, such as when files or resources representing one or more components is checked into or out of a content repository.

Upon the initiation of method 300, step 305 searches for implied connections associated with components. In an embodiments, step 305 searches one or more components for component attributes that specify implied connections. An embodiment of step 305 may search all of the existing components for component attributes specifying implied connections. Another embodiment of step 305 may limit its search to components identified by a previously created list or other data structure identifying components including implied connections. In yet another embodiment, step 305 may search only the components that are currently loaded or instantiated by a user's software application.

In an additional embodiment, step 305 may search a data structure external to the components' data structure to identify implied connections between components. The external data structure may be a database, data file, or any other type of data structure. The external data structure may be associated with the component handling software application, with multiple component handling software applications, with a revision control system, or exist independently of other software applications. Step 305 may search for implied connections using a search or data inspection technique, including querying a software application via an API or other type of interface, parsing component data files, or querying databases storing component data.

Step 310 identifies components associated with broken or missing direct connections between components using the identified implied connections from step 305. Step 310 may identify components associated with broken or missing direct connections using a search or data inspection technique, including querying a software application via an API or other type of interface, parsing component data files, or querying databases storing component data.

In an embodiment, step 310 searches for a direct connection between components corresponding with each of the identified implied connection. If there is no corresponding direct connection between components for an identified implied connection, then step 310 identifies the associated components as having a broken or missing direct connection. In another embodiment, step 310 identifies the components associated with any of the implied connections as having broken or missing direct connections, assuming that the data specifying implied connections, such as component attributes, is removed when its corresponding direct connection is recreated. Thus, in this example, the presence of an implied connection is evidence that the corresponding direct connection is missing or broken.

Optional step 315 may display or present the set of broken direct connections to a user and/or a software application. In an embodiment, step 315 may display a graph of components, with broken or missing direct connections and missing components represented by visual indicators using color, animation, icons or images, line type, or any other type of visual difference from other components and component connections. In a further embodiment, step 315 may provide text data identifying broken direct connections and/or their respective associated components. This text data may be displayed to a user in a list or table form and/or provided to a software application for further processing or logging.

Step 320 attempts to repair the identified broken or missing direct connections. In an embodiment, for each identified implied connection and its identified components, step 320 determines if both of these components currently exist. If not, then this direct connection cannot be repaired yet. Conversely, if both the components associated with an identified implied connection exist, then step 320 creates a direct connection corresponding with the identified implied connection based on the implied connection data, such as the component attributes specifying the implied connection.

In an embodiment, step 320 searches through all of the existing component, whether instantiated or not, to determine whether a component exists. In another embodiment, step 320 limits its search for existing components to the components loaded or instantiated by one or more software applications.

In an embodiment, step 320 creates a direct connection by directing the software application, via an API or other interface type, to create the desired direct connection between two components. In this embodiment, step 320 leverages the direct connection creation functionality of the software application. In another embodiment, step 320 modifies component data structures in memory, in a file, in a database, or in any other type of data storage, to create the desired direct connection.

In an embodiment, if the implied connection includes one or more connection attributes for further defining or modifying the relationship between components, step 320 may add these connection attributes and their values to the newly created direct connection in the form of additional connection attributes and values.

In an embodiment, following the creation of a direct connection corresponding with one of the identified implied connections, step 320 removes the corresponding implied connection. In an embodiment, step 320 removes the component attributes specifying the corresponding implied connection from the components. In another embodiment, step 320 removes the implied connection from an external data structure.

Embodiments of the invention, including methods 200 and 300, may be implemented as one or more stand-alone software applications in communication with component creation or manipulation software applications via an API or other type of interface. Embodiments of the invention, including methods 200 and 300, may be implemented as one or more scripts, macros, dynamically or statically loaded program modules or libraries, or other automated actions executed within a component creation or manipulation software application. Component creation or manipulation applications can include any type of software application capable of creating, modifying, or processing one or more types of computer graphics components, such as computer graphics computer graphics content creation applications for uses including modeling, animation, lighting, texturing, and shading, and revision control system software applications.

Figure 4:
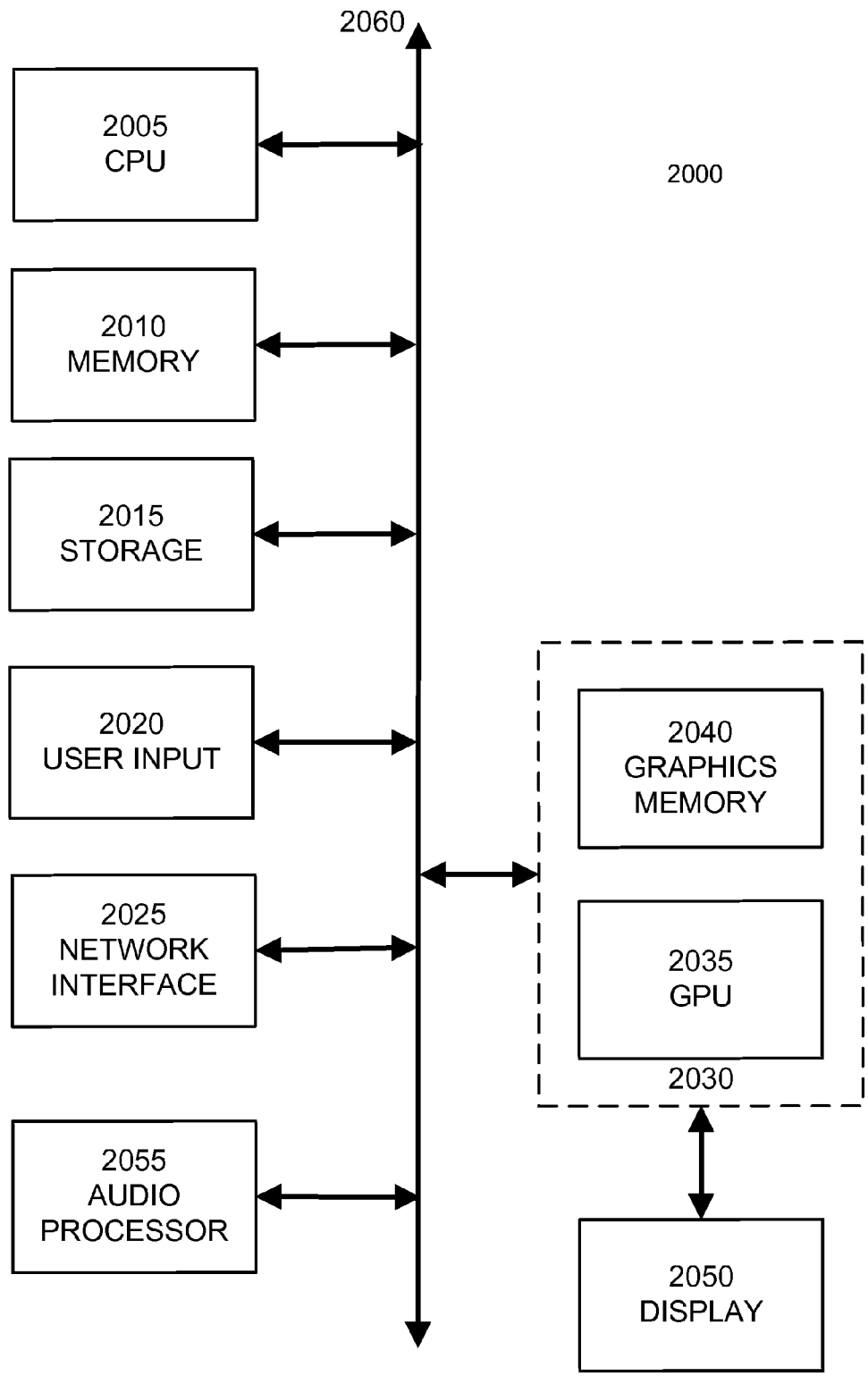
FIG. 4 illustrates a computer system suitable for implementing an embodiment of the invention.

FIG. 4 illustrates a computer system suitable for implementing an embodiment of the invention. FIG. 4 is a block diagram of a computer system 2000, such as a personal computer, video game console, personal digital assistant, or other digital device, suitable for practicing an embodiment of the invention. Computer system 2000 includes a central processing unit (CPU) 2005 for running software applications and optionally an operating system. CPU 2005 may be comprised of one or more processing cores. Memory 2010 stores applications and data for use by the CPU 2005. Storage 2015 provides non-volatile storage for applications and data and may include fixed or removable hard disk drives, flash memory devices, and CD-ROM, DVD-ROM, Blu-ray, HD-DVD, or other magnetic, optical, or solid state storage devices.

User input devices 2020 communicate user inputs from one or more users to the computer system 2000, examples of which may include keyboards, mice, joysticks, digitizer tablets, touch pads, single or multitouch touch screens, still or video cameras, and/or microphones. Network interface 2025 allows computer system 2000 to communicate with other computer systems via an electronic communications network, and may include wired or wireless communication over local area networks and wide area networks such as the Internet. An audio processor 2055 is adapted to generate analog or digital audio output from instructions and/or data provided by the CPU 2005, memory 2010, and/or storage 2015. The components of computer system 2000, including CPU 2005, memory 2010, data storage 2015, user input devices 2020, network interface 2025, and audio processor 2055 are connected via one or more data buses 2060.

A graphics subsystem 2030 is further connected with data bus 2060 and the components of the computer system 2000. The graphics subsystem 2030 includes at least one graphics processing unit (GPU) 2035 and graphics memory 2040. Graphics memory 2040 includes a display memory (e.g., a frame buffer) used for storing pixel data for each pixel of an output image. Graphics memory 2040 can be integrated in the same device as GPU 2035, connected as a separate device with GPU 2035, and/or implemented within memory 2010.

Pixel data can be provided to graphics memory 2040 directly from the CPU 2005. In some implementations, instructions and/or data representing a scene are provided to renderfarm or set of server computers, each similar to computer system 2000, via the network interface 2025 or storage 2015. The renderfarm generates one or more rendered images of the scene using the provided instructions and/or data. These rendered images are returned to the computer system 2000 for display.

Alternatively, CPU 2005 provides the GPU 2035 with data and/or instructions defining the desired output images, from which the GPU 2035 generates the pixel data of one or more output images. The data and/or instructions defining the desired output images can be stored in memory 2010 and/or graphics memory 2040. In an embodiment, the GPU 2035 includes 3D rendering capabilities for generating pixel data for output images from instructions and data defining the geometry, lighting, shading, texturing, motion, and/or camera parameters for a scene. The GPU 2035 can employ any surface or volume rendering technique known in the art to create one or more rendered images from the provided data and instructions, including rasterization, scanline rendering, REYES or micropolygon rendering, ray casting, ray tracing, image-based rendering techniques, and/or combinations of these and any other rendering or image processing techniques known in the art. The GPU 2035 can further include one or more programmable execution units capable of executing shader programs. GPU 2035 can be comprised of one or more graphics processing unit cores.

The graphics subsystem 2030 periodically outputs pixel data for an image from graphics memory 2040 to be displayed on display device 2050. Display device 2050 is any device capable of displaying visual information in response to a signal from the computer system 2000, including CRT, LCD, plasma, OLED, and SED displays. Computer system 2000 can provide the display device 2050 with an analog or digital signal.

In embodiments of the invention, CPU 2005 is one or more general-purpose microprocessors having one or more homogenous or heterogeneous processing cores. In further embodiments, all or a portion of the graphics subsystem 2030 or GPU 2035 is integrated into CPU 2005.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of preserving a component relationship, the method comprising:
    receiving a first notification associated with at least a first direct component connection between a first component and a first instance of a second component;
    converting the first direct component connection to an implied component connection between the first component and the first instance of the second component using a processor;
    receiving a second notification associated with a second instance of the second component; and
    in response to the second notification, converting the implied component connection to a second direct component connection between the first component and the second instance of the second component using the processor.

2. The method of claim 1, wherein converting the implied component connection comprises:
    determining if a component identifier associated with the implied component connection corresponds with the second instance of the second component; and
    in response to the determination that the component identifier associated with the implied component connection corresponds with the second instance of the second component, creating a direct connection between the first component and the second instance of the second component.

3. The method of claim 2, wherein the component identifier is assigned to the first and second instances of the second component.

4. The method of claim 3, wherein the component identifier includes a component name.

5. The method of claim 1, wherein the implied component connection is specified by at least one component attribute of the first component.

6. The method of claim 1, wherein the implied component connection is specified using a data structure external to a first component data structure.

7. The method of claim 1, wherein the second instance of the second component is adapted to replace the first instance of the second component following a destructive component operation.

8. The method of claim 1, further comprising:
    removing the implied component connection following the conversion of the implied component connection to the second direct component connection.

9. The method of claim 1, wherein the first notification includes an indication of destruction of the first direct component connection.

10. The method of claim 1, wherein the first notification includes an indication of destruction of the first instance of the second component.

11. The method of claim 1, wherein converting the first direct component connection to an implied component connection comprises:
    searching a set of component connections to identify the first direct component connection via an association of the first direct component connection with the first instance of the second component.

12. The method of claim 1, wherein the notification is received from a component creation or manipulation software application.

13. The method of claim 1, wherein the notification is received from a revision control system application.

14. The method of claim 1, wherein the first and second components are selected from a group consisting of:
    three-dimensional models of geometry; texture maps; simulation systems;
    lighting and shading programs; and animation data and deformer functions.

15. A method of restoring a component relationship, the method comprising:
    using a computer processor, searching for at least one implied component connection associated with a set of components;
    identifying at least one broken direct component connection based on the at least one implied component connection;
    identifying a first component and a second component associated with the identified at least one broken direct component connection from the at the least one implied component connection; and
    repairing the identified at least one broken direct component connection associated with the first component based on the at least one implied component connection.

16. The method of claim 15, wherein repairing the identified at least one broken direct component connection comprises:
    determining that the first component and the second component associated with the identified at least one broken direct component connection exist in the set of components; and
    in response to the determination that the first component and the second component associated with the identified at least one broken direct component connection exist, creating a direct component connection between the first and second components based on the at least one implied component connection.

17. The method of claim 16, further comprising:
    removing the at least one implied component connection following the creation of the direct component connection.

18. The method of claim 15, wherein identifying the at least one broken direct component connection comprises:
    searching the set of components for a direct component connection corresponding with the at least one implied component connection; and
    defining the at least one broken direct component connection in response to an absence in the set of components of the direct component connection corresponding with the at least one implied component connection.

19. The method of claim 15, wherein searching for at least one implied component connection is in response to an instantiation of the set of components.

20. The method of claim 15, wherein searching for at least one implied component connection is in response to a loading of the set of components into a component creation or manipulation application.

21. The method of claim 15, wherein searching for at least one implied component connection is in response to a direction by a revision control system.

22. The method of claim 15, further comprising:
creating an output including an indication of the identified at least one broken direct component connection.

23. The method of claim 22, wherein the indication includes a visual indication adapted to be displayed to a user.

24. The method of claim 15, wherein the at least one implied component connection is specified by at least one component attribute of the first component.

25. The method of claim 15, wherein the at least one implied component connection is specified using a data structure external to a first component data structure.

26. The method of claim 15, wherein the first and second components are selected from a group consisting of:
three-dimensional models of geometry; texture maps; simulation systems; lighting and shading programs; and animation data and deformer functions.

* * * * *

UNITED STATES PATENT AND TRADEMARK OFFICE
CERTIFICATE OF CORRECTION

Page 1 of 1

PATENT NO. : 8,253,753 B1
APPLICATION NO. : 12/488815
DATED : August 28, 2012
INVENTOR(S) : Baraff et al.

It is certified that error appears in the above-identified patent and that said Letters Patent is hereby corrected as shown below:

In the Claims:

Column 14, Claim 15, Line 37, please delete "the" after at.

Signed and Sealed this
Twenty-fifth Day of December, 2012

David J. Kappos
*Director of the United States Patent and Trademark Office*